United States Patent
Albertson et al.

[15] 3,653,273
[45] Apr. 4, 1972

[54] TWO-SPEED TRANSMISSION

[72] Inventors: Robert V. Albertson, Wayzata; Victor N. Albertson, Minneapolis, both of Minn.

[73] Assignee: Minnesota Automotive, Inc., Mankato, Minn.

[22] Filed: Nov. 4, 1970

[21] Appl. No.: 86,651

[52] U.S. Cl. ........................... 74/217 B, 74/217 S, 192/3.6 Z
[51] Int. Cl. ........................... F16h 11/04, F16d 67/00
[58] Field of Search ............... 74/217 B, 217 S; 192/3.61, 192/3.62, 3.54

[56] References Cited

UNITED STATES PATENTS

| | | | |
|---|---|---|---|
| 2,488,892 | 11/1949 | Arzt | 74/217 B |
| 2,560,991 | 7/1951 | Schuricht | 74/217 B |
| 3,581,853 | 6/1971 | Hoff | 74/217 B |

*Primary Examiner*—Leonard H. Gerin
*Attorney*—Merchant & Gould

[57] ABSTRACT

Disclosed is a first sprocket adapted to operate as a driving sprocket for the rear wheel of a motor bicycle or the like and a second sprocket adapted to be driven through a chain by a motor, which second sprocket is connected through an over running clutch to a shaft mounting the first sprocket. A third sprocket is mounted on the shaft for rotation relative to the shaft and engageable with the shaft through a manually operable disc clutch. The speed of driving the second and third sprockets is such that whenever the third sprocket is driven, by engaging the manually engageable clutch, the shaft turns at a speed to cause the over running clutch to operate as a bearing so that the second sprocket has no effect on the shaft.

9 Claims, 7 Drawing Figures

INVENTORS
ROBERT V. ALBERTSON
VICTOR N. ALBERTSON
BY
Merchant & Gould
ATTORNEYS

INVENTORS
ROBERT V. ALBERTSON
VICTOR N. ALBERTSON
BY
Merchant & Gould
ATTORNEYS 3,653,273

TWO-SPEED TRANSMISSION

BACKGROUND OF THE INVENTION

1. Field of the Invention

In motor bicycles and the like it is often desirable to provide two speeds, one of which is a relatively high speed for roads and the like and a second of which is a relatively low speed for power. It is essential that mechanism be supplied whereby the power can quickly and easily be shifted between the two speeds while maintaining a certain amount of safety so that the motor, gears, etc. are not inadvertently ruined.

2. Description of the Prior Art

In the prior art many two-speed transmission systems are disclosed but, in general, these systems are fully automatic and change speeds automatically with a change in the speed of the motor. This is relatively unsatisfactory because in many instances the driver may want to remain in the lower driving speed even though the speed of the motor increases beyond the shifting speed. Some of the prior art two-speed devices are shiftable by means of pins or the like which are moved axially to connect different sprockets to a shaft. These systems are relatively undesirable because they cannot be easily shifted at any time and, further, excessive wear causes the parts to operate improperly and in many instances produces premature shifting to an undesirable speed. Thus, it has been found that all of the prior art two-speed transmission systems either shift automatically at a certain speed or are shifted manually by apparatus which is highly susceptible to wear and, in some instances, is not convenient or easily operated.

SUMMARY OF THE INVENTION

The present invention pertains to a manually shiftable two-speed transmission apparatus including a first transmission element mounted for rotation about an axis, a second transmission element constructed for rotation at a first speed and engaged with said first transmission element by an over running clutch means, and a third transmission element constructed for rotation at a second speed and engageable with the first transmission element through a manually actuatable clutch so that actuating the manual clutch causes the third transmission element to drive the first transmission element at a speed which causes the over running clutch means to operate as a bearing and render the second transmission element ineffective.

It is an object of the present invention to provide a new and improved two-speed transmission apparatus.

It is a further object of the present invention to provide an improved two-speed transmission apparatus which is manually operable and wherein the wear caused by shifting is greatly reduced.

It is a further object of the present invention to provide a two-speed drive system wherein the motor and parts are protected through a clutch in either of the speeds.

These and other objects of this invention will become apparent to those skilled in the art upon consideration of the accompanying specification, claims and drawings.

BRIEF DESCRIPTION OF THE DRAWINGS

Referring to the drawings, wherein like characters indicate like parts throughout the figures.

DESCRIPTION OF THE PREFERRED EMBODIMENTS

Figure 1:
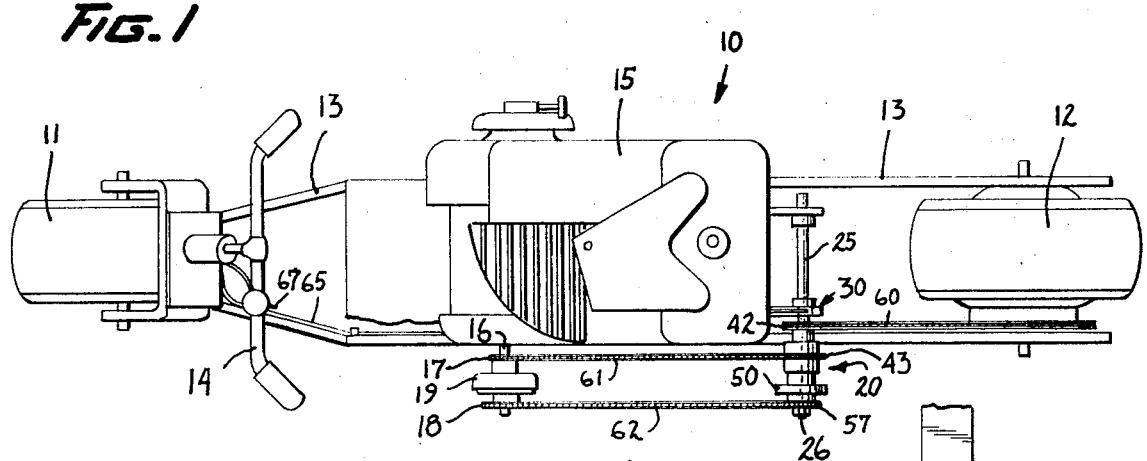
FIG. 1 is a view in top plan of a motor bicycle having the present two-speed drive system, including the present two-speed transmission, operatively mounted thereon.
Figure 2:
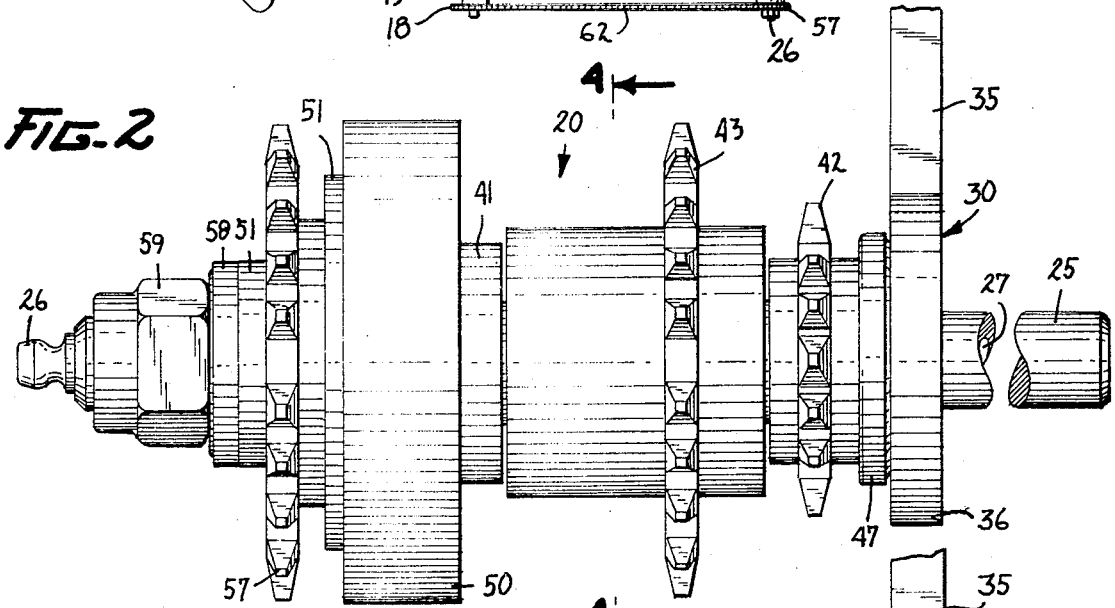
FIG. 2 is an enlarged elevational view of the present two-speed transmission apparatus, portions thereof broken away.
Figure 3:
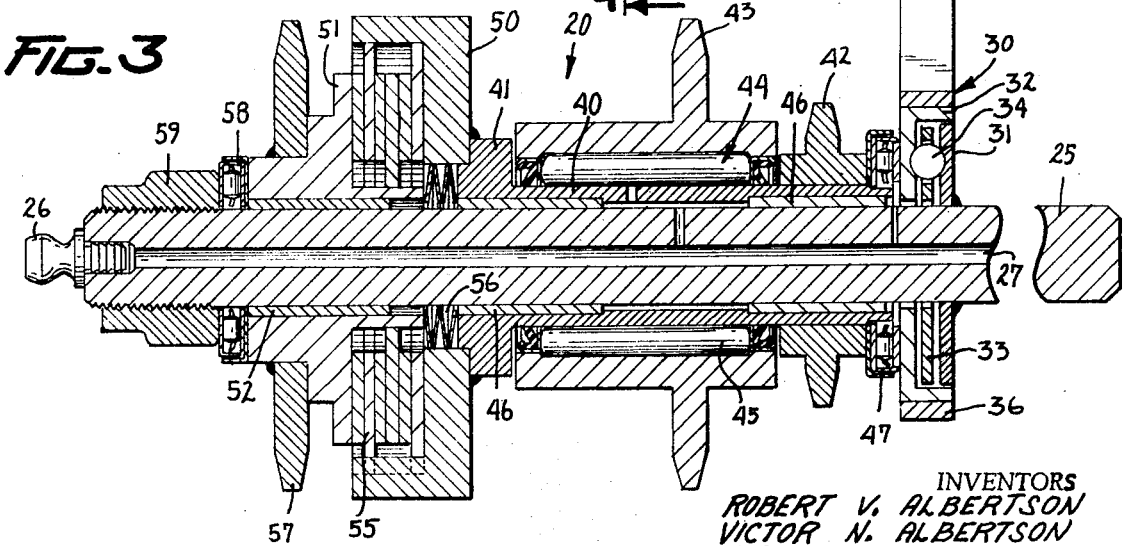
FIG. 3 is an axial sectional view of the two-speed transmission apparatus illustrated in FIG. 2.

In FIG. 1, the numeral 10 generally designates a bicycle having a front wheel 11 and a rear wheel 12 operatively mounted by means of a frame 13. The bicycle 10 is operated by turning front wheel 11 with handle bars 14, in the usual fashion. A motor 15 is mounted on the frame 13 generally centrally between the front wheel 11 and the rear wheel 12 for powering the bicycle 10. The motor 15 has a shaft 16 rotatably attached thereto and extending transversely outwardly from the left side of the bicycle (downwardly in FIG. 1). A first driving element, which in this embodiment is a sprocket 17, is affixed to the shaft 16 and spaced inwardly toward the motor 15 from the end of the shaft 16. A second driving element, which in this embodiment is sprocket 18, is rotatably mounted on the shaft 16 and a driving clutch means, which in this embodiment is a centrifugal type clutch 19, is mounted on the shaft 16 between the sprocket 17 and the sprocket 18 for connecting the sprocket 18 to the shaft 16 upon operation of the centrifugal type clutch 19. Thus, the sprocket 17 is connected directly to the motor 15 through the shaft 16 and the sprocket 18 is connected to the shaft 16 of the motor 15 through operation of the centrifugal type clutch 19. It should be understood that the driving clutch means might be any convenient type of clutch but that a centrifugal type clutch (many varieties of which are well known in the art) is generally preferred because it allows the motor 15 to rotate at a predetermined relatively high speed and develop a relatively high torque before engaging and connecting the sprocket 18 to the shaft 16. Through the use of centrifugal clutch 19 a somewhat smaller motor 15 can be utilized, since it is never engaged while it is rotating at the slower speeds, and thereby, producing a lower torque.

Two speed transmission apparatus generally designated 20, which is the embodiment illustrated in FIGS. 2—6, is mounted on the frame 13 of the bicycle 10 approximately midway between the shaft 16 of motor 15 and the rear wheel 12. The two speed transmission apparatus 20 includes an elongated shaft 25 fixedly attached to the frame 13 generally parallel with the shaft 16 and extending transversely outwardly from the left side thereof. In the embodiment of the transmission apparatus 20 illustrated in FIGS. 2–6, the shaft 25 serves as a non-rotating base to operatively mount the remainder of the components. Also, the shaft 25 has a grease fitting 26 affixed in the outermost end thereof and a central passageway 27 communicating with the grease fitting 26 and a plurality of transverse passageways utilized to transmit lubricant to the various moving parts.

A manually operable clutch actuator, generally designated 30, is positioned on the shaft 25 in inwardly spaced relationship from the outermost end thereof. The actuator 30 includes a radially outwardly extending plate 31 fixedly attached to the shaft 25 by some convenient means, such as welding, press fitting, etc., and a cup shaped housing 32 rotatably mounted on the shaft 25 adjacent the plate 31 for axial movement relative to the plate 31. The plate 31 and housing 32 provide two parallel adjacent surfaces (See FIG. 5) each having a plurality of generally axially aligned dimples therein. Each of the dimples in plate 31 is constructed so that it extends a short distance circumferentially along the plate 31 and decreases in depth, in a ramp like fashion, in a counterclockwise direction, looking at the dimpled surface of the plate 31. The dimples in the adjacent surface of the housing 32 are similarly constructed but decrease in depth in the opposite direction. A disc shaped ball retainer 33 having a plurality of circumferentially spaced openings therethrough, is positioned between the adjacent surfaces of the plate 31 and housing 32 so that the openings therethrough correspond with the axially outlined dimples. Balls 34, which in this embodiment are steel ball bearings, are positioned in the openings of the retainer 33 and have a sufficient diameter to maintain the plate 31, retainer 33 and housing 32 in closely spaced relationship when the dimples and retainer 33 openings are aligned axially. Rotation of the housing 32 relative to the plate 31, in the proper direction, causes the balls 34 to move in the dimples toward the shallower portions thereof and, consequently, produces axial separation of the plate 31 and housing 32. A radially outwardly extending lever 35 having a cylindrical ring 36 frictionally engaged with the housing 32, is utilized to rotate the housing 32 to produce axial displacement thereof.

Figure 4:
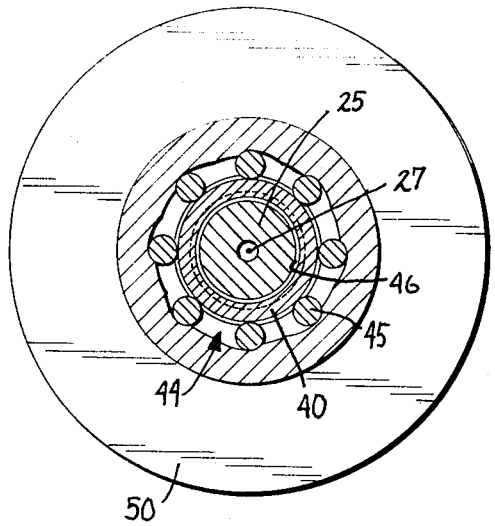
FIG. 4 is a sectional view as seen from the line 4—4 in FIG. 2.
Figure 5:
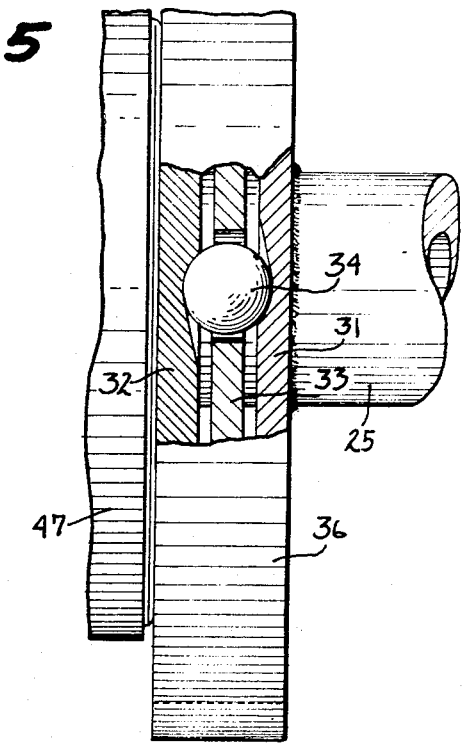
FIG. 5 is an enlarged fragmentary view of the manually operable clutch incorporated in the apparatus illustrated in FIG. 2, portions thereof broken away and shown in section.

An elongated tubular bearing race 40 is constructed with a radially outwardly extending shoulder 41 adjacent one end thereof. The inner diameter of the race 40 is slightly larger than the outer diameter of the shaft 25. First and second transmission elements, which in this embodiment are sprockets 42 and 43 respectively, are mounted on the race 40 in parallel side by side relationship with the sprocket 43 abutting the shoulder 41 and the sprocket 42 adjacent the opposite end thereof. The sprocket 42 is fixedly engaged on the race 40 for rotation therewith, by some means such as keys, welding, frictional engagement, etc. The sprocket 43 is engaged on the race 40 by means of an over-running clutch 44 positioned between the outer periphery of the race 40 and the inner surface of the sprocket 43. A cross-sectional view of the over-running clutch 44 is illustrated in FIG. 4, wherein it can be seen that the clutch 44 consists of a plurality of rollers 45 positioned in spaced apart relationship about the periphery of the race 40 with each roller 45 being positioned in a ramplike retaining opening. Referring to FIG. 4, it can be seen that rotation of the sprocket 43 in a counterclockwise direction, relative to the race 40, causes the rollers 45 to wedge between the body of the sprocket 43 and the race 40 to cause the race 40 and sprocket 43 to be fixedly engaged together for mutual rotation. Rotation of the sprocket 43 in a clockwise direction, relative to the race 40, causes the rollers 45 to operate as a simple roller bearing.

The entire assembly of the race 40 and sprockets 42 and 43 is rotatably mounted on the shaft 25 for axial movement therealong by means of a pair of bushings 46. The race 40 is mounted on the shaft 25 with the end opposite the shoulder 41 adjacent the housing 32 of the manually operable clutch 30. A thrust bearing assembly 47 is mounted between the housing 32 and the sprocket 42 to allow axial pressure on the housing 32 against the sprocket 42 without affecting the rotation thereof.

A generally cup shaped clutch housing 50 having a central opening therethrough is coaxially positioned over the shaft 25 and affixed to the shoulder 41, by welding or the like, so that the cavity therein is directed away from the race 40 toward the end of the shaft 25. A tubular clutch shaft 51 has an inner diameter somewhat larger than the outer diameter of the shaft 25 and is coaxially mounted on the shaft 25 by means of a bushing 52 for rotation relative thereto. The tubular shaft 51 has a shoulder 53 formed at approximately the mid portion thereof and directed toward the housing 50 to form a generally toroidally shaped opening 54 between the housing 50 and the tubular shaft 51. A plurality of friction discs 55 are positioned within the toroidal opening 54 to provide frictional engagement between the housing 50 and the tubular shaft 51 when the housing 50 is urged axially toward the tubular shaft 51. A compression spring 56, which may be a plurality of Belleville washers, is positioned coaxially on the shaft 25 between the tubular shaft 51 and the race 40 to normally urge the housing 50 away from the tubular shaft 51 so that the friction discs 55 are disengaged.

A transmission element, which in this embodiment is a sprocket 57, is coaxially affixed to the tubular shaft 51 opposite the shoulder 53 from the friction discs 55. A thrust bearing assembly 58 is coaxially positioned over the shaft 25 in abutment with the outer end of the tubular shaft 51 and a lock nut 59 is threadedly engaged on the end of the shaft 25 to maintain the entire assembly in position. With the lock nut 59 limiting the axial movement of the various components, operation of the manually operable clutch actuator 30 forces the race 40 and the housing 50 toward the tubular shaft 51 so that the friction discs 55 frictionally engage the housing 50 with the tubular shaft 51, causing the sprocket 57 to be rotatably engaged with the sprocket 42. When the manually operable clutch actuatory 30 is in the normal position the sprocket 57 is disengaged from the sprocket 42 and the sprockets 42 and 43 are rotatably engaged.

In the bicycle 10 the sprocket 42 is engaged with a sprocket affixed to the rear wheel 12 by means of a chain 60. The sprocket 43 is engaged with the driving sprocket 17 by means of a chain 61. The sprocket 57 is engaged with the driving sprocket 18 by means of a chain 62. The sprockets 43 and 17 are constructed so that they drive the sprocket 42 at some desirable relatively low speed and the sprockets 18 and 57 are constructed so that they drive the sprocket 42 at a desirable relatively high speed. Thus, with the clutch actuator 30 in the normal position, the driving sprocket 17 and the sprocket 43 drive the sprocket 42 through the over-running clutch 45, which operates as a clutch to engage the sprocket 43 with the race 40. When the clutch actuator 30 is operated the sprocket 18 and sprocket 57 are frictionally engaged with the race 40 and the sprocket 42. Because the sprocket 18 and sprocket 57 drive the race 40 at a relatively high speed, the over-running clutch 44 operates as a bearing and the sprocket 17 and sprocket 43 have no effect on the sprocket 42. It should be noted that the centrifugal clutch 19 is in the drive system when the clutch actuator 30 is operated and the over-running clutch 44 is in the drive system when the clutch actuator 30 is in the normal position. Thus, the driving system is protected in either of the speeds. Further, the frictional disc type clutch is not utilized in the lower speeds, where high power and much stress on the frictional clutch would be prevalent, so that the clutch wear is greatly reduced.

Figure 6:
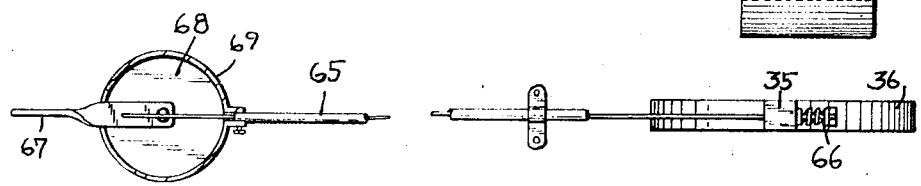
FIG. 6 is a plan view illustrating the manual control for the manually operable clutch, portions thereof broken away.

Referring to FIG. 6, the lever 35 and ring 36 of the manually operable clutch actuator 30 are illustrated, with the remainder of the apparatus eliminated for simplicity. One end of a Bowden cable 65 is affixed to the lever 35 by means of a spring and nut assembly 66 and the other end is engaged in an off center hole in a pivotally mounted handle 67. The handle 67 is pivotally mounted on a generally horizontal plate 68 having an upwardly extending ridge 69 extending partially around the periphery thereof to operate as a stop to limit the pivotal movement of the handle 67. Because the Bowden cable 65 is affixed to the handle 67 at a distance from the pivotal axis thereof, rotation of the handle 67 in the clockwise direction (in FIG. 6) or into the illustrated position, moves the lever 35 to the left and, thereby, operates the clutch actuator 30. The handle 67 is positioned so that the end of the Bowden cable 65 is slightly over center in the illustrated position to maintain the handle 67 against the ridge 69 in the illustrated positions. When the handle 69 is rotated counterclockwise in FIG. 6 the Bowden cable 65 is released and the lever 35 returns to the normal position. Thus, the two-speed transmission apparatus 20 is conveniently controllable by means of the handle 69 affixed to the handle bars 14 to place the driving mechanism of the bicycle 10 in either of the speeds at any desirable time.

Figure 7:
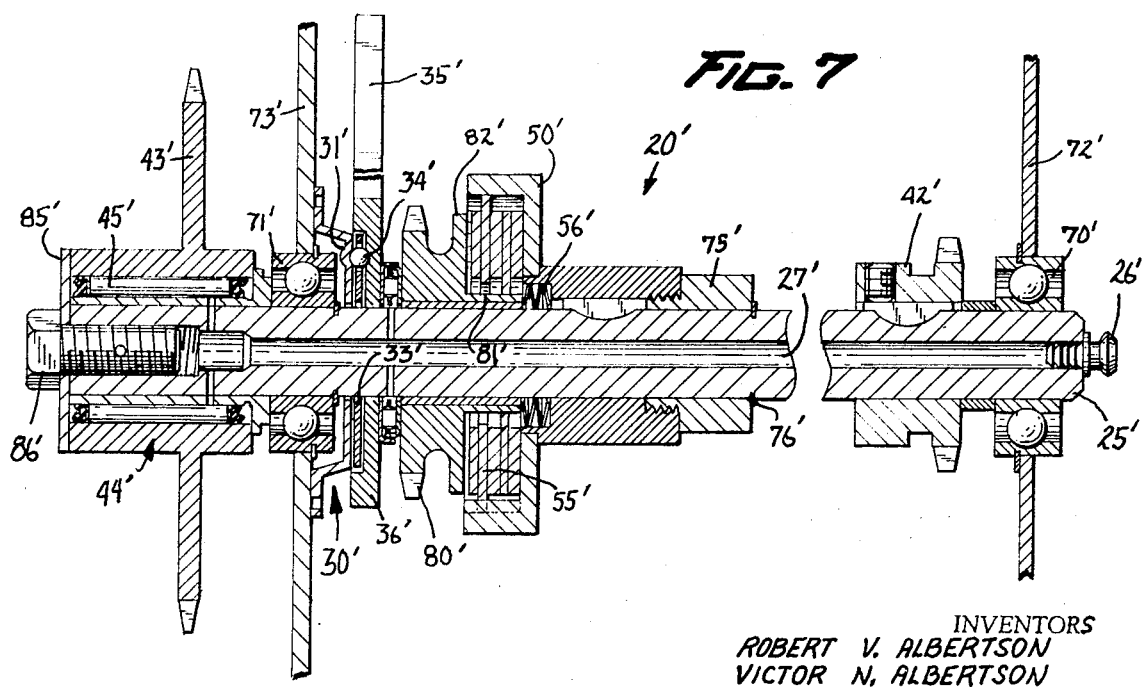
FIG. 7 is an axial sectional view similar to FIG. 3, portions thereof broken away, illustrating another embodiment of the two-speed transmission apparatus.

Referring to FIG. 7, another embodiment of the two speed transmission apparatus is illustrated wherein similar parts are designated with similar numbers and primes are added to all of the numbers to indicate a different embodiment. In the embodiment illustrated in FIG. 7 a shaft 25' is mounted for rotation by means of bearings 70' and 71' engaged in fixed supports 72' and 73', respectively. A driven sprocket 42' is keyed onto the shaft 25' adjacent the bearing 70'. A sleeve 75' is keyed to the shaft 25' for rotation therewith and the axial movement thereof toward the sprocket 42' is limited by means of a snap ring 76'. The sleeve 75' is fixedly attached to a housing 50' of a disk clutch assembly. A sprocket 80', having a tubular portion 81', is rotatably positioned on the shaft 25' adjacent the housing 50'. A plurality of friction discs 55' are positioned in the housing 50' adjacent the shoulder 82' for frictional engagement between the housing 50' and the shoulder 82' as previously described in the first embodiment.

A compression spring 56' is positioned between the sleeve 75' and the tubular portion 81' of the sprocket 80'. A thrust bearing assembly 58' is coaxially positioned over the shaft 25' adjacent the sprocket 80' and a housing 32', ring 36' and lever 35' of a manually operable clutch actuatory 30' are positioned adjacent thereto. A ball retainer 33' and balls 34' are positioned within the housing 32' and a plate 31' maintains these components in position. The plate 31' has an axially extending flange therearound which is affixed to the fixed support 73'. Thus, operation of the clutch actuator 30' urges the sprocket 80' toward the housing 50' to frictionally engage the sprocket 80' with the shaft and, thus, the sprocket 42'.

The shaft 25' extends through the bearings 71' to the opposite sides of the fixed support 73' and a sprocket 43' is rotatably affixed adjacent the end of the shaft 25' by means of an over-running clutch 44'. A washer 85' is coaxially affixed to the end of the shaft 25' by means of a bolt 86' threadedly engaged in an opening in the end of the shaft 25'. Thus, the sprocket 43' is engaged with the shaft 25' at lower speeds, through the over-running clutch 44' and operation of the clutch actuator 30' engages the sprocket 80' to the shaft 25' at higher speeds, during which the over-running clutch 44' operates as a bearing to disengage the sprocket 43'.

While we have shown and described two specific embodiments of this invention, further modifications and improvements will occur to those skilled in the art. We desire it to be understood, therefore, that this invention is not limited to the particular form shown and we intend in the appended claims to cover all modifications which do not depart from the spirit and scope of this invention.

What is claimed is:

1. Two-speed transmission apparatus comprising:
   a. base means for operatively mounting the transmission apparatus;
   b. a first transmission element;
   c. means mounting said first transmission element on said base means for rotation about an axis, at least a portion of said mounting means rotating with said first transmission element;
   d. a second transmission element constructed for rotation at a first speed;
   e. over-running clutch means rotatably connecting said second transmission element to said mounting means for rotation about said axis, said over-running clutch means being characterized by operating as a clutch during rotation of said mounting means at the first speed and operating as a bearing for a second speed of rotation of said mounting means;
   f. a third transmission element constructed for rotation at the second speed; and
   g. manually actuatable clutch means connected to said third transmission element and said mounting means for operatively connecting said third transmission element to said mounting means upon actuation of said manually actuatable clutch means whereby said third transmission element and said mounting means rotate at the second speed to cause said over-running clutch means to operate as a bearing.

2. Two-speed transmission apparatus as set forth in claim 1 wherein the mounting means includes an elongated shaft rotatably mounted on the base means and having the first transmission element affixed thereto for rotation therewith.

3. Two-speed transmission apparatus as set forth in claim 1 wherein the mounting means includes an elongated shaft fixedly attached to the base means and a sleeve rotatably mounted on the shaft and affixed to the first transmission element.

4. Two-speed transmission apparatus as set forth in claim 1 wherein the manually actuatable clutch means includes a disk type clutch engageable through axial pressure thereon and a two-part actuator mounted adjacent thereto for producing axial pressure on the clutch upon movement of one actuator part relative to the other.

5. Two-speed transmission apparatus as set forth in claim 4 wherein the two-part actuator includes a pair of generally parallel, axially spaced apart disks mounted on a common axis, ball receiving grooves defined by adjacent surfaces of said disks having a plurality of spaced apart balls therein, and at least one of said disks having a plurality of outwardly extending ramps formed in the adjacent surface thereof to receive said balls thereon upon relative rotation of said disks in a first direction and cause axial separation of said disks.

6. Two-speed transmission apparatus as set forth in claim 1 wherein the first, second and third transmission elements include sprockets.

7. A two-speed drive system comprising:
   a. a frame;
   b. motor means fixedly mounted on said base having a shaft affixed to said motor means for rotation by said motor means;
   c. a first driving element affixed to said shaft for rotation therewith;
   d. a second driving element rotatably mounted on said shaft for rotation relative to said shaft;
   e. driving clutch means mounted on said shaft for operatively connecting said second driving element to said shaft for rotation with said shaft upon actuation of said driving clutch means;
   f. two-speed transmission apparatus including
      1. base means operatively mounting the transmission apparatus on said frame,
      2. a first transmission element,
      3. means mounting said first transmission element on said base means for rotation about an axis generally parallel with but spaced from the shaft of said motor means, at least a portion of said mounting means rotating with said first transmission element,
      4. a second transmission element constructed for rotation at a first speed,
      5. over-running clutch means rotatably connecting said second transmission element to said mounting means for rotation about said axis, said over-running clutch means being characterized by operating as a clutch during rotation of said mounting means at the first speed and operating as a bearing for a second speed of rotation of said mounting means;
      6. a third transmission element constructed for rotation at the second speed; and
      7. manually actuatable clutch means connected to said third transmission element and said mounting means for operatively connecting said third transmission element to said mounting means upon actuation of said manually actuatable clutch means whereby said third transmission element and said mounting means rotate at the second speed to cause said over-running clutch means to operate as a bearing; and
   g. said second transmission element being connected to said first driving element for rotation therewith and said third transmission element being connected to said second driving element for rotation therewith.

8. A two-speed system as set forth in claim 7 wherein the driving clutch means is a centrifugal type clutch.

9. A two-speed drive system as set forth in claim 7 wherein the first and second driving elements and the second and third transmission elements are sprockets connected by means of chains.

* * * * *